(12) United States Patent
Hera et al.

(10) Patent No.: US 8,320,581 B2
(45) Date of Patent: Nov. 27, 2012

(54) VEHICLE ENGINE SOUND ENHANCEMENT

(75) Inventors: Cristian M. Hera, Framingham, MA (US); Davis Y. Pan, Arlington, MA (US)

(73) Assignee: Bose Corporation, Framingham, MA (US)

( * ) Notice: Subject to any disclaimer, the term of this patent is extended or adjusted under 35 U.S.C. 154(b) by 218 days.

(21) Appl. No.: 12/716,887

(22) Filed: Mar. 3, 2010

(65) Prior Publication Data

US 2011/0216916 A1 Sep. 8, 2011

(51) Int. Cl.
H04B 1/00 (2006.01)

(52) U.S. Cl. ............... 381/86; 381/61; 381/98; 381/119

(58) Field of Classification Search ............ 381/86, 381/98–103, 61–62, 302, 119, 77; 700/94
See application file for complete search history.

(56) References Cited

U.S. PATENT DOCUMENTS

| | | |
|---|---|---|
| 5,237,617 A | 8/1993 | Miller |
| 5,371,802 A | 12/1994 | McDonald et al. |
| 5,418,857 A | 5/1995 | Eatwell |
| 5,469,510 A | 11/1995 | Blind et al. |
| 5,635,903 A | 6/1997 | Koike et al. |
| 5,687,075 A | 11/1997 | Stothers |
| 5,691,893 A | 11/1997 | Stothers |
| 5,748,748 A | 5/1998 | Fischer et al. |
| 5,835,605 A | 11/1998 | Kunimoto |
| 6,275,590 B1 * | 8/2001 | Prus ........................... 381/61 |
| 6,356,185 B1 | 3/2002 | Plugge et al. |
| 6,912,286 B1 | 6/2005 | Daly |
| 7,088,829 B1 | 8/2006 | Schick et al. |
| 7,106,867 B2 | 9/2006 | Daly |
| 7,188,005 B2 | 3/2007 | Toba et al. |
| 7,203,321 B1 | 4/2007 | Freymann et al. |
| 7,302,062 B2 | 11/2007 | Christoph |
| 7,787,633 B2 * | 8/2010 | Costello et al. ................. 381/61 |
| 7,876,913 B2 * | 1/2011 | Kobayashi et al. ............. 381/86 |
| 8,045,723 B2 * | 10/2011 | Kobayashi et al. ............. 381/61 |
| 8,130,974 B2 * | 3/2012 | Sakamoto et al. ............. 381/86 |
| 2002/0136415 A1 | 9/2002 | Daly |

(Continued)

FOREIGN PATENT DOCUMENTS

DE 9005598 U1 7/1990

(Continued)

OTHER PUBLICATIONS

International Search Report and Written Opinion dated May 11, 2011 for PCT/US2011/024673.

(Continued)

*Primary Examiner* — Vivian Chin
*Assistant Examiner* — Fatimat O Olaniran
(74) *Attorney, Agent, or Firm* — Bose Corporation

(57) ABSTRACT

A vehicle engine harmonic enhancement system. A method for operating the system includes providing a first engine harmonic enhancement audio signal and equalizing the first engine harmonic enhancement audio signal separately for each of the plurality of loudspeakers to provide individually equalized loudspeaker engine harmonic enhancement audio signals. A vehicle audio system includes a plurality of loudspeakers, an entertainment audio system, and an engine harmonic enhancement system. A method includes equalizing an entertainment audio signal to provide an equalized entertainment audio signal; providing an engine harmonic enhancement audio signal; equalizing the engine harmonic enhancement audio signal separately from the entertainment audio signal to provide an equalized engine harmonic enhancement audio signal; and combining the equalized entertainment audio signal with the equalized engine harmonic enhancement audio signal.

7 Claims, 5 Drawing Sheets

U.S. PATENT DOCUMENTS

| | | | |
|---|---|---|---|
| 2005/0169484 A1* | 8/2005 | Cascone et al. | 381/61 |
| 2005/0175186 A1 | 8/2005 | Yasushi et al. | |
| 2005/0207585 A1 | 9/2005 | Christoph | |
| 2005/0213776 A1 | 9/2005 | Honji et al. | |
| 2005/0232432 A1 | 10/2005 | Yasushi et al. | |
| 2005/0259830 A1 | 11/2005 | Vaishya | |
| 2007/0160227 A1 | 7/2007 | Kogure et al. | |
| 2007/0223728 A1* | 9/2007 | Sakamoto et al. | 381/86 |
| 2008/0013752 A1* | 1/2008 | Stephens | 381/103 |
| 2008/0181422 A1 | 7/2008 | Christoph | |
| 2008/0192954 A1 | 8/2008 | Honji et al. | |
| 2008/0273722 A1 | 11/2008 | Aylward et al. | |
| 2008/0310642 A1* | 12/2008 | Sakamoto et al. | 381/61 |
| 2009/0060208 A1 | 3/2009 | Pan et al. | |

FOREIGN PATENT DOCUMENTS

| | | | |
|---|---|---|---|
| DE | 19746523 A1 | 5/1998 | |
| DE | 19945259 C1 | 1/2001 | |
| EP | 469023 A1 | 2/1992 | |
| EP | 528817 A1 | 3/1993 | |
| EP | 992976 A2 | 4/2000 | |
| EP | 1705644 A1 | 9/2006 | |
| EP | 1906384 A1 | 4/2008 | |
| EP | 1923865 A1 | 5/2008 | |
| GB | 2252657 A | 8/1992 | |
| GB | 2254979 A | 10/1992 | |
| GB | 2258496 A | 2/1993 | |
| GB | 2261103 A | 5/1993 | |
| GB | 2271908 A | 4/1994 | |
| GB | 2271909 A | 4/1994 | |
| GB | 2287851 A | 9/1995 | |
| GB | 2447063 A | 9/2008 | |
| JP | 2674252 | 9/1991 | |
| JP | 1990158296 A | 2/1992 | |
| JP | 1991203495 A | 2/1993 | |
| JP | 3625073 A | 12/1995 | |
| JP | 3362577 A | 3/1997 | |
| JP | 10083187 A | 3/1998 | |
| JP | 11296185 A | 10/1999 | |
| JP | 2001-282263 A | 10/2001 | |
| JP | 3261128 | 2/2002 | |
| JP | 2006-193002 A | 7/2006 | |
| JP | 2007-259186 A | 10/2007 | |
| WO | 9013109 A1 | 11/1990 | |
| WO | 9208225 A1 | 5/1992 | |
| WO | 2007016527 A1 | 2/2007 | |
| WO | 2008090337 A2 | 7/2008 | |

OTHER PUBLICATIONS

International Search Report and Written Opinion dated May 22, 2012 for PCT/US2012/020706.

* cited by examiner

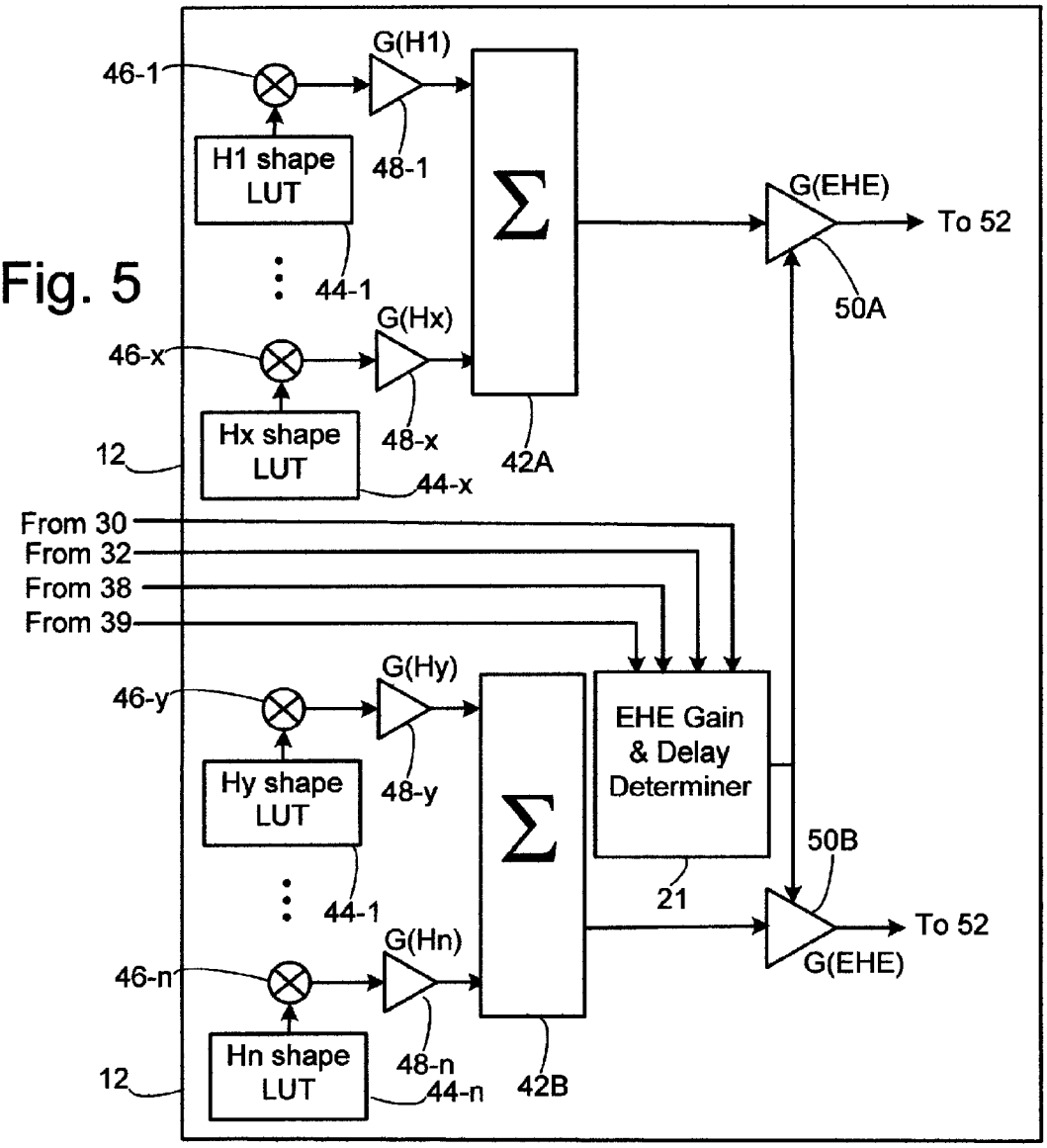

VEHICLE ENGINE SOUND ENHANCEMENT

BACKGROUND

This specification describes a vehicle engine sound enhancement system. Engine sound enhancement systems provide enhanced sound to modify the sonic and/or vibratory experience of a vehicle driver, a vehicle occupant, or a person nearby the vehicle. For example, an engine sound enhancement system may cause a relatively quiet vehicle, for example an electrically powered vehicle, to provide an indication to the driver that the engine is operating and to provide a sensory indication to operating conditions of the vehicle, for example the speed at which the vehicle is traveling. In a hybrid vehicle, the sound enhancement system may provide to the driver a constant sonic experience, despite changes from internal combustion power to electric motor power. An engine sound enhancement system may allow the occupants to experience the engine sound at a loud, stimulating, level, without being annoyingly loud to persons outside the vehicle. An engine sound enhancement system can provide an audible indication to pedestrians that a moving vehicle, for example an electrically powered vehicle, is nearby.

SUMMARY

In one aspect, a method for processing a vehicle engine harmonic enhancement system, includes providing a first engine harmonic enhancement audio signal and equalizing the first engine harmonic enhancement audio signal separately for each of the plurality of loudspeakers to provide individually equalized loudspeaker engine harmonic enhancement audio signals. The equalizing the engine harmonic enhancement audio signal separately for each of the plurality of loudspeakers may include modifying at least two of the phase, the amplitude, and the delay of the engine enhancement audio signal. The method may include determining a fundamental harmonic frequency and the providing the first engine harmonic enhancement audio signal may include providing harmonics of the fundamental harmonic frequency and separately equalizing each of the harmonics of the fundamental harmonic frequency. The equalizing the engine harmonic enhancement audio signal separately for each of the plurality of loudspeakers may include modifying at least two of the phase, the amplitude, and the delay of the engine enhancement audio signal. The method may further include providing a second engine harmonic enhancement audio signal and the providing the first engine harmonic enhancement audio signal may include providing a first set of harmonics of the fundamental harmonic frequency; and separately equalizing each of the first set of harmonics of the fundamental harmonic frequency, and the providing the second engine harmonic enhancement audio signal may include providing a second set of harmonics of the fundamental harmonic frequency and separately equalizing each of the second set of harmonics of the fundamental harmonic frequency. The equalizing the first engine harmonic enhancement audio signal may include equalizing the first engine harmonic enhancement audio signal and transducing the first engine harmonic enhancement audio signal so that the apparent source of the transduced first sound enhancement audio signal is a first vehicle location and the equalizing the second engine harmonic enhancement audio signal may include equalizing the second engine harmonic enhancement audio signal and transducing the second engine harmonic enhancement audio signal so that the apparent source of the transduced second sound enhancement audio signal is a second vehicle location. The method may further include combining the individually equalized loudspeaker engine harmonic enhancement audio signals with entertainment audio signals for corresponding loudspeakers. The providing the first engine harmonic enhancement audio signal may include providing a stream of engine harmonic enhancement gains; smoothing the stream of engine harmonic enhancement gains to provide a stream of smoothed engine harmonic enhancement gains; and applying the stream of smoothing engine harmonic gains to the first engine harmonic enhancement audio signal. The method may further include determining if the engine load is increasing or decreasing, and if the engine load is decreasing, changing a smoothing parameter. The smoothing may include low pass filtering. Providing the first engine harmonic audio signal may include providing a stream of engine harmonic enhancement gains, determining if the engine load is increasing or decreasing, and if the engine load is decreasing, applying a delay to an application of the stream of engine harmonic gains.

In another aspect, in an vehicle audio system includes a plurality of loudspeakers, an entertainment audio system, and an engine harmonic enhancement system, a method includes equalizing an entertainment audio signal to provide an equalized entertainment audio signal; providing an engine harmonic enhancement audio signal; equalizing the engine harmonic enhancement audio signal separately from the entertainment audio signal to provide an equalized engine harmonic enhancement audio signal; and combining the equalized entertainment audio signal with the equalized engine harmonic enhancement audio signal. The providing the engine harmonic enhancement audio signal may include determining a fundamental harmonic frequency; providing harmonics of the fundamental harmonic frequency; and separately equalizing each of the harmonics of the fundamental harmonic frequency. The equalizing the engine harmonic enhancement audio signal may include processing the engine enhancement audio signal to provide a plurality of engine enhancement audio signal each corresponding to one of the plurality of loudspeakers and separately equalizing each of the plurality of engine enhancement audio signals.

Other features, objects, and advantages will become apparent from the following detailed description, when read in connection with the following drawing, in which:

BRIEF DESCRIPTION OF THE SEVERAL VIEWS OF THE DRAWING

FIG. 5 is a block diagram of another EHE EQ and spatial processor;

DETAILED DESCRIPTION

Figure 1:
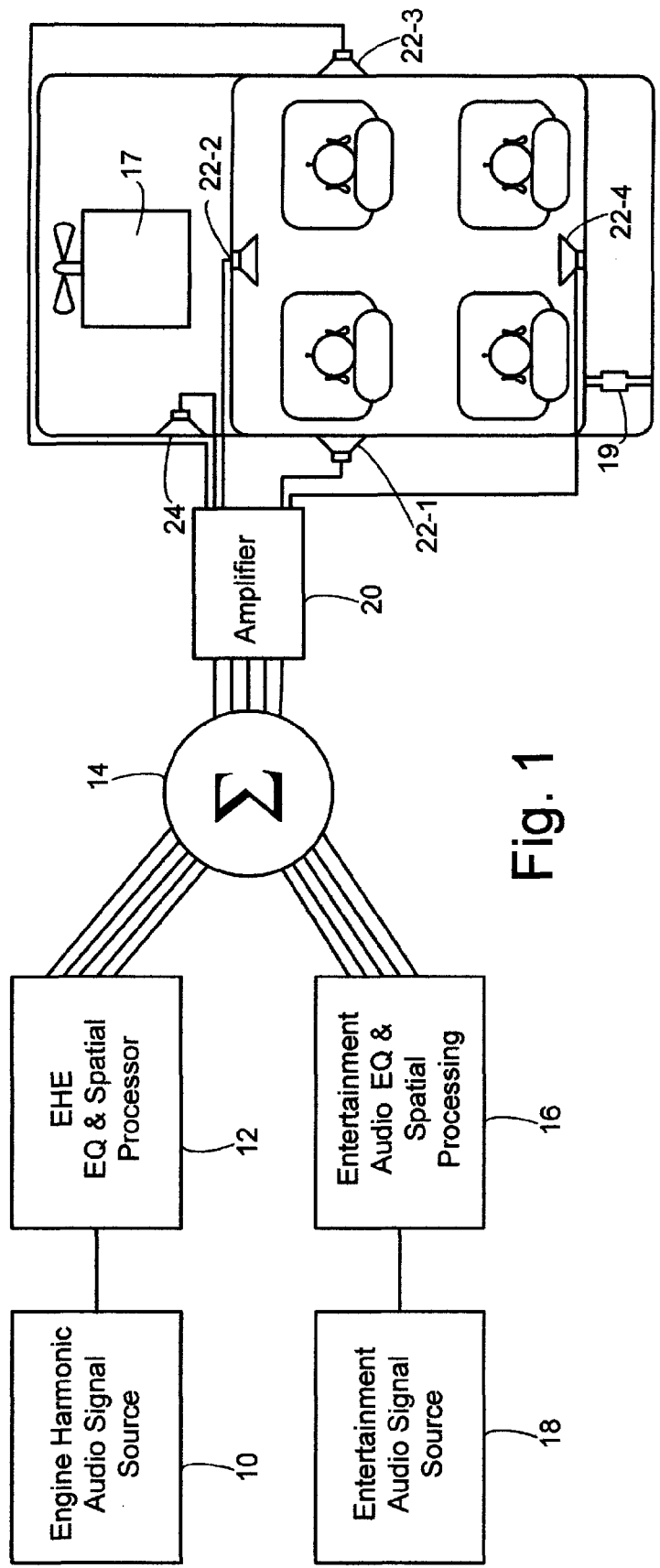
FIG. 1 is a block diagram of a vehicle including a vehicle engine sound enhancement system.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

FIG. 1 is a block diagram of a vehicle including a vehicle engine sound enhancement system. An engine harmonic audio signal source 10 is operationally coupled to an engine harmonic enhancement (EHE) equalizer and spatial processor 12, which is in turn coupled to a summer 14. Also coupled to the summer 14 by an entertainment audio equalizer and spatial processor 16 is an entertainment audio signal source 18. The summer 14 is coupled through a multi-channel amplifier 20 to a number of loudspeakers 22-1-22-4 positioned about the vehicle cabin, and in some implementations may be positioned, for example as loudspeaker 24 to radiate acoustic energy to the exterior of the vehicle. The operational coupling between the engine harmonic audio signal source and the EHE EQ and spatial processor is indicated by a single line. A more complete description of the operational relationship between the engine harmonic audio signal source 10 and the EHE EQ and spatial processor 12 is shown in subsequent figures and is described in more detail below. The couplings between the EHE equalizer and spatial processor 12, the entertainment audio equalizer and spatial processor 16, the summer 14, and the amplifier 20 may be multichannel, as indicated by the multiple lines. As stated above, signal lines may be implemented as discrete analog or digital signal lines, as a single discrete digital signal line with appropriate signal processing to process separate streams of audio signals, or as elements of a wireless communication system.

In operation, the entertainment audio equalizer 18 and entertainment audio equalizer and spatial processor 16 may operate conventionally, to provide equalized and spatially processed audio entertainment to the occupants of the vehicle cabin. In some implementations, the entertainment audio signal source can include announcement audio signals, for navigation, warning signals, and the like. The EHE audio signal source provides signals representing synthetically created or recorded engine sounds of harmonic frequencies related to the engine speed, typically referenced in revolutions per minute (RPM). The EHE equalizer and spatial processor processes the EHE audio signals so that, when reproduced by the loudspeakers 22-1-22-4 and 24 they provide a desired sonic experience. For example, it may be desired for the sound corresponding to EHE audio signals to appear to come from either a front engine bay 17 or a rear exhaust pipe 19. The processed EHE audio signals and the processed entertainment audio signals are summed at summer 14, amplified by amplifier 20 and transduced to acoustic energy by the loudspeakers 22-1-22-4 and 24.

Figure 2:
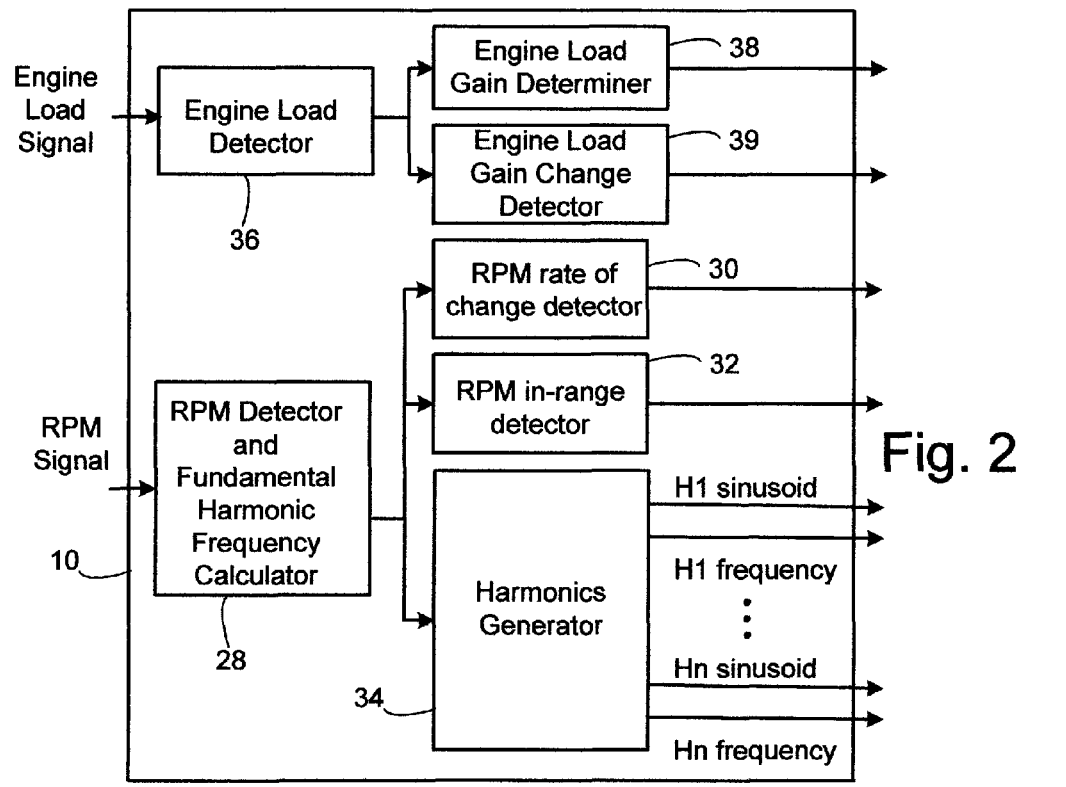
FIG. 2 is block diagram of an engine harmonic audio signal source.

FIG. 2 is block diagram of an engine harmonic audio signal source 10, in greater detail. An RPM detector and fundamental frequency calculator 28 receives as input a signal indicative of the engine speed in RPM. The RPM detector and fundamental frequency calculator 28 is operationally coupled to an RPM rate of change detector 30, an RPM in-range detector 32, and a harmonics generator 34. An engine load detector 36 receives as input a signal indicative of engine load and is operationally coupled to an engine load gain determiner 38 and an engine load gain change detector 39.

Figure 3:
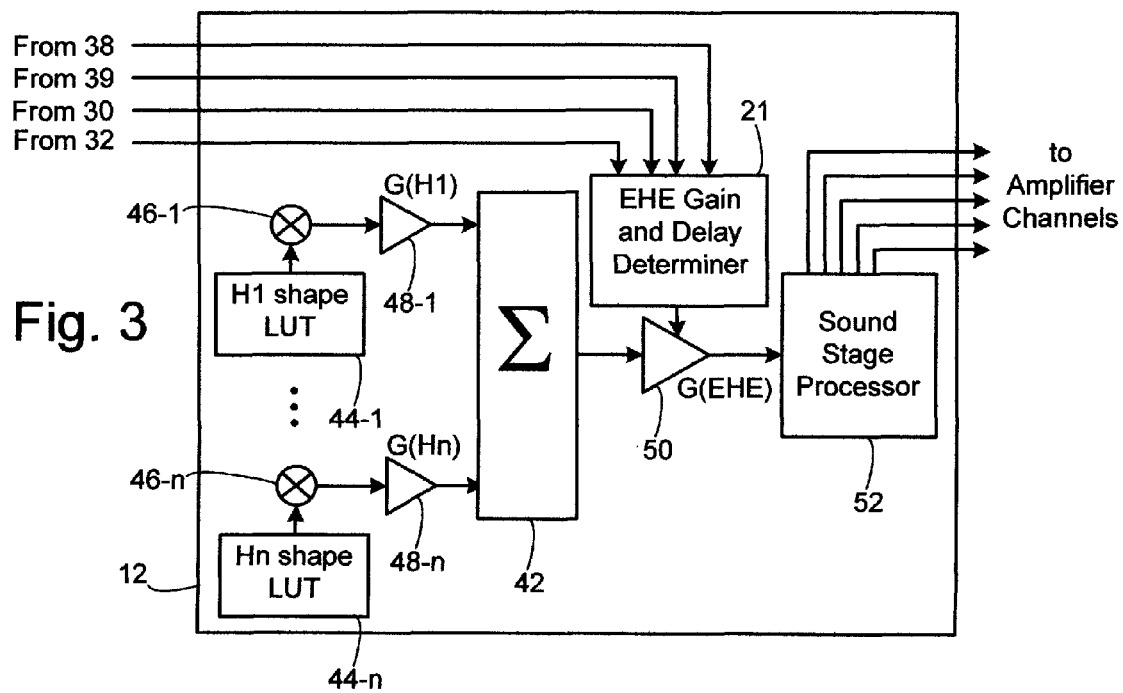
FIG. 3 is a block diagram of an engine harmonic enhancement (EHE) equalizer and spatial processor.

FIG. 3 is a block diagram of the EHE equalizer and spatial processor 12, in greater detail. An EHE gain and delay determiner 21 is operationally coupled to receive input from the RPM rate of change detector 30, the engine load gain determiner 38 and the RPM in-range detector 32 of the engine harmonic audio signal source 10 of FIG. 2, and to receive input from a harmonics summer 42 and to output a signal to overall enhancement gain 50. Overall enhancement gain 50 is coupled to sound stage processor 52. H1 shape look-up table (LUT) 44-1 . . . Hn shape LUT 44-n are operationally coupled to the harmonics generator 34 of the engine harmonic audio signal source 10 of FIG. 2. Summers 46-1 . . . 46-n are operationally coupled to corresponding harmonic shape LUTs 44-1 . . . 44-n, to the harmonics generator 34 of the engine harmonic audio signal source 10 of FIG. 2, and to a corresponding harmonic gain 48-1 . . . 48-n. Harmonic gains 48-1 . . . 48-n are operationally coupled to harmonics summer 42.

The operation of the individual elements of FIGS. 2 and 3 will now be explained. The RPM signal that is input to the RPM detector and fundamental frequency calculator 28 determines the fundamental frequency of the engine harmonics and the engine load signal controls the overall sound level of the harmonic enhancement. The RPM signal can be an analog signal over a wire or a digital signal over a bus (GM-LAN, CAN, MOST, etc.). In one implementation, the RPM signal indicates a known number of pulses per engine revolution. If the RPM signal comes from an ignition module, the number of pulses per revolution (PPR) is usually equal to the number of engine cylinders which fire each revolution or half of the total number of active engine cylinders since only half of a conventional (four-stroke) engine's cylinders fire each revolution. For example, an ignition-based RPM signal from an 8 cylinder engine will have 4 PPR. If the RPM comes from a crankshaft sensor the number of pulses is equal to the number of equally-spaced teeth on the crankshaft position wheel, not including special teeth used to indicate crank position, typically to indicate the top-dead-center (TDC) position of the crankshaft.

The RPM detector and fundamental harmonic frequency calculator measures the time between successive RPM pulses, and computes the reciprocal to determine the fundamental engine harmonic frequency. To reject TDC pulses or errors in RPM detection, the detector may replace a new pulse period with, for example, a previous pulse period if the new pulse period is greater than a predetermined tolerance (e.g. +/−25%) of the previously accepted pulse period.

The engine load detector 36 of FIG. 2 determines the inherent engine sound level to properly balance the sound enhancement. A signal representing engine load is well suited for controlling sound enhancement level for at least two reasons. First, overall engine noise levels increase monotonically with increasing positive engine loads. Second, strong enhancement is typically desirable only for positive engine loads, when the engine propels the transmission. Negative engine loads occur when the transmission propels the engine, also known as engine brake. While there may be high levels of inherent engine noise for during engine brake, noise cancellation may be desired for this situation but significant sound enhancement is rarely desired.

A vehicle's Engine Control Unit (ECU) will typically have available several of the following signals which correlate well with the engine load and may be available to the EHE system either in analog or digital form, for example, accelerator pedal position (APP); throttle position sensor (TPS); mass air flow (MAF); manifold absolute pressure (MAP); engine torque; and/or computed engine load. Any one of these signals is suitable for EHE control if there is sufficiently-close-to one-to-one relationship between that signal and the desired sound level of the harmonic enhancement.

The RPM rate of change detector 30 of FIG. 2 detects the rate of change of the RPM. An engine should emit pleasant, audible, powerful sounds as aural feedback only when a driver requires significant amounts of power from it. Such usage is usually coupled with both markedly increasing engine load and RPM. Under other engine load conditions the engine should be quieter. When a vehicle is cruising on a level highway both engine load and RPM are generally steady. During vehicle deceleration at a fixed transmission gear, both engine load and RPM drop. Therefore, the RPM rate of change detector 30 may reduce or turn off engine enhancement whenever the change in RPM is either small or decreasing.

The RPM in-range detector 32 of FIG. 2 determines if the fundamental engine rotation frequency is below a minimum frequency threshold or above a maximum frequency threshold that determine a range of RPM within which the EHE is designed to operate.

The harmonics generator 34 of FIG. 2 outputs two parameters for each enhanced engine harmonic (which could be a non-integer harmonic). First, it computes the frequency for each enhanced harmonic by multiplying the fundamental engine rotation frequency by the order of each enhanced engine harmonic. Next, it converts the fundamental frequency into an index to the harmonic shape Look-Up Table (LUT).

The engine load gain determiner 38 of FIG. 2 includes two parts. The first is a look-up table which converts an input signal representative of the engine load and coverts it to an enhancement gain. This gain adjusts the enhancement level to balance the inherent engine noise, which depends on the engine load. Multiple engine level control tables may be required if there are significant differences in the sound levels of different harmonics as a function of the signal representative of the engine load. The second part smoothes the gain values. Tunable parameters for this module include attack, delay, and decay hold. These tunable features accommodate non-ideal engine load signals which may, for example, drop more abruptly than the inherent engine noise when a driver releases the throttle.

The engine load gain change detector 39 determines whether the engine load is increasing or decreasing and may determine the rate at which the engine load is increasing or decreasing. Generally, a more realistic effect is attained if the amplitude of the EHE signal tracks the engine load if the engine load is increasing, but decreases more gradually than the engine load if the engine load is decreasing.

The harmonic shape LUTs 44-1-44-$n$ of FIG. 3 are frequency-to-gain look-up tables (LUTs) which enables the sound level of each enhanced harmonic to be frequency dependent. This shape control outputs a gain which adjusts the harmonic enhancement level. The resulting enhancement, output through the speakers and acoustically summed with the inherent harmonic sound level, produces a sound level which matches a desired target. To achieve this goal, the look-up table must account for the inherent harmonic level, the target harmonic level, and the transfer function of the audio system, all ideally measured at the occupant's ears. The look-up tables should have enough frequency resolution such that sound level values interpolated between adjacent frequency indices satisfy desired enhancement requirements and not cause enhancement artifacts due to too-coarse frequency spacing. For computational efficiency all the harmonic shape LUT's may use the same frequency indices, usually based on the first harmonic of the engine RPM. If so, then all shape LUT's will have the same number of entries. Assuming this is the case, the highest order EHE harmonic will dictate the required number of LUT entries because it will cover the greatest range of frequencies for a given RPM range. For example, a first order harmonic will cover a 90 Hz range (10 to 100) for a RPM range from 600 to 6000, while a tenth order harmonic will cover 900 Hz for the same RPM range.

The harmonic gains 48-1 . . . 48-$n$ apply individual harmonic specific gains to each of the harmonics, based on input from the harmonic shape LUT's 44-1-44-$n$ and the instantaneous values of the sinusoids for each of the harmonic frequencies determined by the harmonics generator 34.

The EHE gain and delay determiner 21 determines the amount of gain to be applied by the EHE overall enhancement gain 50. The EHE gain determiner may use the engine load, the change in engine load, the RPM, and the rate of change in RPM to determine the EHE gain. Additionally, the EHE gain determiner may smooth the gain values so that the sound variation is natural, and undistorted, similar to the sound variation in time of a mechanical system.

The overall enhancement gain 50 can change the overall sound level of individual harmonics without changing the frequency-dependent "shape" of the enhancement. This feature is not absolutely required in all cases since the harmonic shape LUTs 44-1-44-$n$ can incorporate these gains. The overall enhancement gain 50 outputs a monophonic, summed-and-scaled EHE audio signal.

The sound stage processor 52 processes the monophonic, summed-and-scaled EHE signal to determine the acoustic imaging of the sound enhancement system. The sound stage processor processes the monophonic EHE signal through a separate audio equalization filter for each loudspeaker 22-1-22-4 and 24 of FIG. 1. The audio equalization filters control the magnitude and phase response as a function of frequency, and delays. Besides the traditional entertainment audio equalization and spatial imaging tuning techniques, sound stage processor 52 may also adjust the gain and even turn off certain EHE speakers over certain frequency ranges to achieve the desired sonic imaging. Because EHE imaging requirements are usually different from the requirements for entertainment audio at least some of the EHE equalization components may be separate from the entertainment audio equalization. The sound stage processor 52 operates on the EHE signal to achieve not only the desired amplitudes of the desired harmonics, but also to achieve the desired apparent source of the engine harmonics, for example the engine bay 17 or the muffler 19 of FIG. 1.

Figure 4:
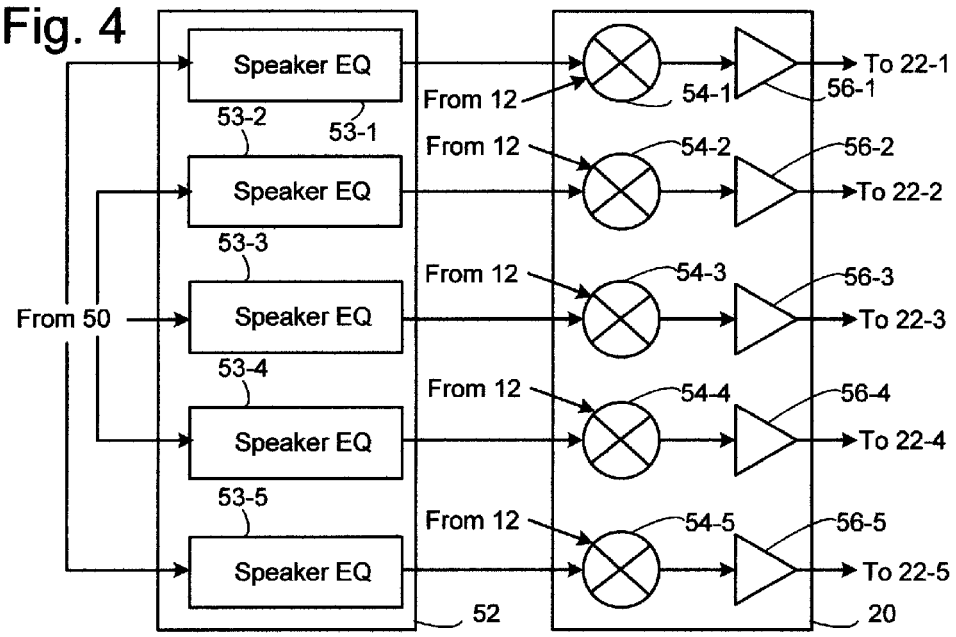
FIG. 4 is a block diagram of a sound stage processor and an amplifier

The sound stage processor 52 and the amplifier 20 are shown in more detail in FIG. 4. The sound stage processor 52 includes a plurality of equalizers (EQs) 53-1-53-5, one for each speaker. The amplifier 20 includes a plurality of summers 54-1-54-5 and a plurality of channel amplifiers 56-1-56-5 both one for each speaker. In some examples the number of equalizers may be greater or less than the actual number of speakers, and equalize the signal according to a set of ideal speaker locations. The equalized outputs are re-mixed to match the actual number of speakers, either by an additional stage of the sound stage processor 52 or by processing within the amplifier 20.

In operation, each of the speaker EQs 53-1-53-5 applies an equalization, which can include amplitude (which can include turning off the speaker) and phase adjustment and application of delay to the signal from the overall enhancement gain 50. The individually equalized signals from the speaker EQs 53-1-53-5 are summed in the amplifier at the summers 54-1-54-5 with the signals from the entertainment audio system intended for the corresponding speaker, and the summed signals are amplified by the channel amplifiers 56-1-56-5. The amplified channels signals are then transmitted to the loudspeakers 22-1-22-4 and 24, which transduce the audio signals to sound.

In the EHE system described in FIGS. 1-4, there is a single audio signal from overall enhancement gain 50, or in other words the EHE system has only one channel, that is, monophonic.

FIG. 5 shows a more complex EHE EQ and spatial processor 12 that has more than one channel. The EHE EQ and spatial processor 12 processes two groups of harmonics H1-Hx and Hz-Hn separately. In some implementations, the harmonics H1-Hx may be the lower order harmonics and the harmonics Hz-Hn may be upper order harmonics. Each of the shape LUTs 44-1-44x and 44y-44n and the harmonic gains 48-1-48-x and 48-y-48n operate in the manner described above to apply a gain to each of the harmonics. Summer 42A sums the outputs of harmonic gains 48-1-48-x and overall enhancement gain 50A operates in the manner described above to prepare an EHE audio signal based on the combined harmonic gains 48-1-48-x for sound stage processor 52. Similarly, summer 42B sums the outputs of harmonic gains 48-y-48-n and overall enhancement gain 50B operate in the manner described above to prepare an EHE audio signal based on the combined harmonic gains 48-y-48-n for sound stage processor 52. The EHE gain and delay determiner 21 operates as described above to determine, based on input from the RPM rate of change detector 30, the RPM in-range detector 32, the engine load gain determiner 38, and the engine load gain change detector 39, a gain to apply at overall enhancement gains 50A and 50B. The EHE EQ and spatial processor 12 can be expanded to include three or more channels.

Figure 6:
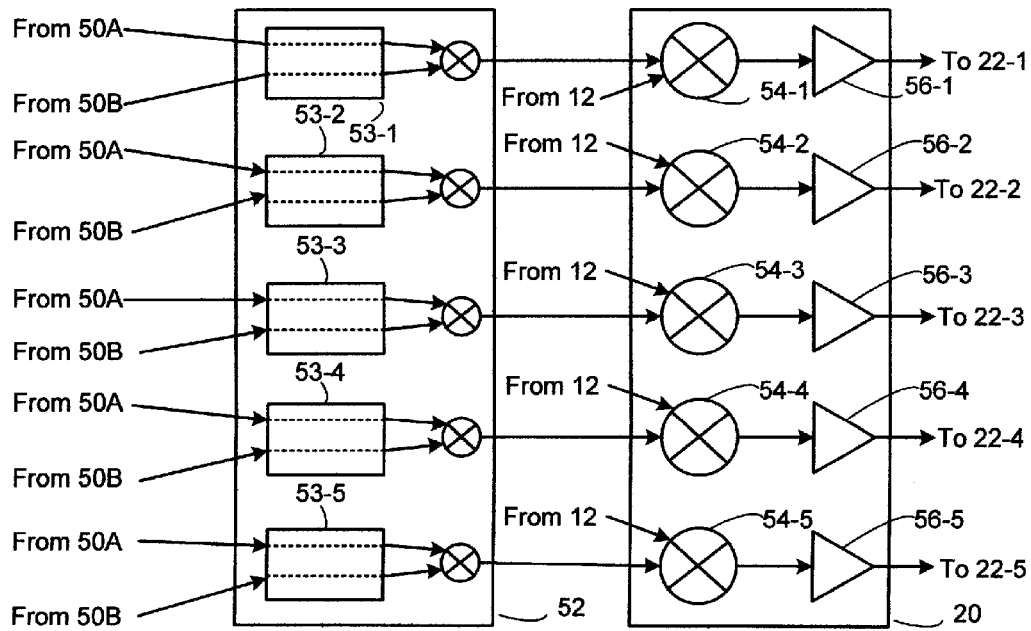
FIG. 6 is a block diagram of a sound stage processor.

FIG. 6 shows a sound stage processor 52 for use in the EHE EQ and spatial processor 12 of FIG. 5. The sound stage processor 52 of FIG. 6 processes the summed-and-scaled EHE signals from overall enhancement gains 50A and 50B to determine an acoustic imaging for each of the sets of harmonics 46-1-46-x and 46-y-46-n. The sound stage processor separately processes each of the EHE signals from overall enhancement gains 50A and 50B through separate audio equalization filters 53-1-53-5 for each loudspeaker 22-1-22-4 and 24 of FIG. 1. Each equalization filter 53-1-53-5 may apply a different equalization to the EHE signals from the overall enhancement gains 50A and 50B, as represented by the separate paths in dashed lines through the equalization filters 53-1-53-5. The two equalization paths are summed after equalization and provided to the amplifier 20 and processed as described above in the discussion of FIG. 4. The audio equalization filters control the magnitude and phase response as a function of frequency, and delays. Besides the traditional entertainment audio equalization and spatial imaging tuning techniques, sound stage processor 52 may also adjust the gain and even turn off certain EHE speakers over certain frequency ranges to achieve the desired sonic imaging. Because EHE imaging requirements are usually different from that for entertainment audio at least some of the EHE equalization components may be separate from the entertainment audio equalization. The sound stage processor 52 operates on the EHE signal to achieve not only the desired amplitudes of the desired harmonics, but also to achieve the desired apparent source for each of the sets of engine harmonics. For example, the source of the higher end harmonics could be the engine bay 17 and the source of the lower order harmonics could be the muffler 19 of FIG. 1. The EHE EQ and spatial processor 12 of FIG. 5 and the sound stage processor of FIG. 6 can be expanded to provide more than two channels.

Figure 7:
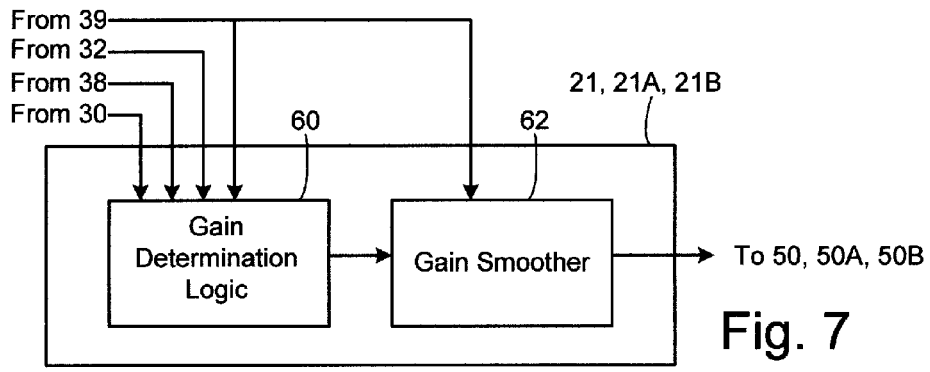
FIGS. 7-9 are block diagrams of EHE gain and delay determiners.

FIG. 7 shows an EHE gain and delay determiner that can be used for any of elements 21, 21A, or 21B. The EHE gain and delay determiner of FIG. 7 includes gain determination logic 60 that receives as input from the RPM rate of change detector 30, the RPM in-range detector 32, the engine load gain determiner 38, and may also receive input from the engine load gain change detector 39 and determines and outputs a stream of EHE gains. The stream of EHE gains determined by the gain determination logic may then be smoothed by a gain smoother 62 to reduce the possibility of abrupt changes in the EHE gain. The smoothing may take the form of slewing, windowed averaging, low pass filtering, a non-linear smoothing technique, a time-varying smoothing technique, or others. In one implementation, the gain smoother 62 is a low pass filter, which can be a single pole low pass filter or a variable pole low pass filter. If the engine load is decreasing, the gain smoother may change a smoothing parameter. For example, the break frequency of a low pass filter may be changed or the width of the window in a windowed averaging system may be changed.

Figure 8:
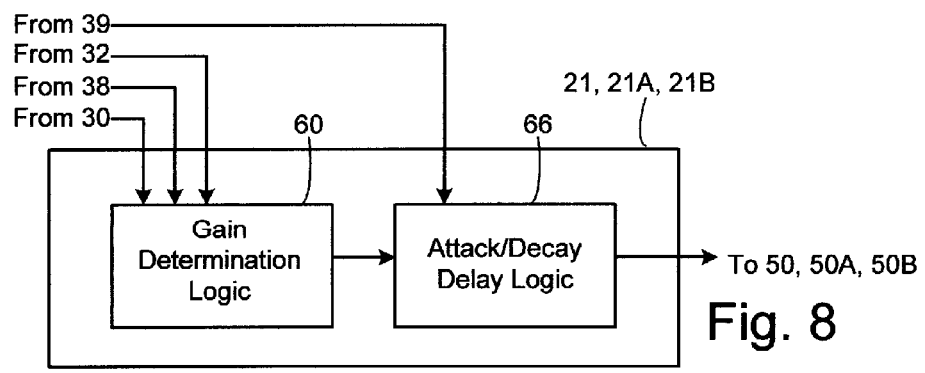

FIG. 8 shows an EHE gain and delay determiner 21 that can be used for any of elements 21, 21A, or 21B. The EHE gain and delay determiner of FIG. 8 includes gain determination logic 60 that receives as input from the RPM rate of change detector 30, the RPM in-range detector 32, and the engine load gain determiner 39 and determines and outputs a stream of EHE gains. The stream of EHE gains is then processed by attack/decay delay logic 66. As stated above in the discussion of engine load gain change detector 39, a more realistic effect is attained if the amplitude of the EHE signal tracks the engine load if the engine load is increasing, but decreases more gradually than the engine load if the engine load is decreasing. Attack/decay logic 66 determines if the engine load is increasing or decreasing. If the engine load is decreasing, the attack/decay logic 66 may apply a delay to the application of the gain.

Figure 9:
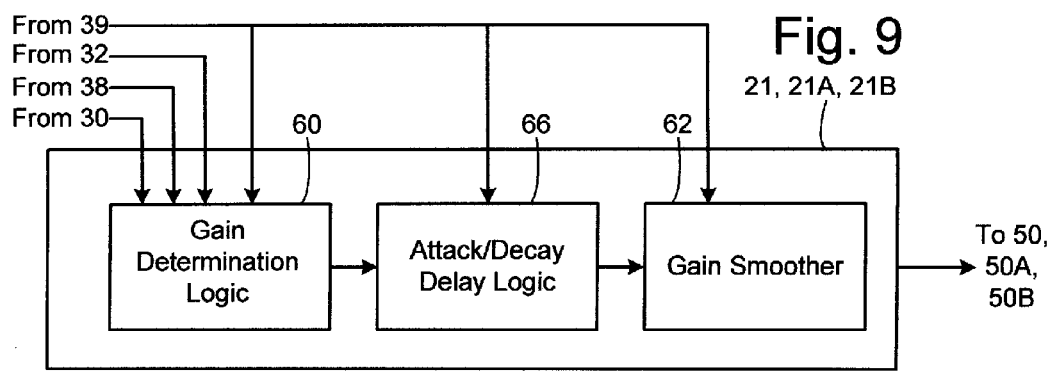

FIG. 9 shows an EHE gain and delay determiner that can be used for any of elements 21, 21A, or 21B. The EHE gain and delay determiner of FIG. 9 includes gain determination logic 60 that operates as described in the discussion of FIG. 8, coupled to a attack/decay delay logic that operates as described in FIG. 8, and a gain smoother, that operates as described in FIG. 7.

An EHE system according to FIGS. 1-9 provides a better acoustic image of the EHE sound. The processing of the individual harmonics individually by the harmonic gains 48-1 . . . 48-n provides a more pleasing and realistic overall rendition of the engine enhancement sounds, and the individual equalization of both amplitude, phase, and delay of the audio signals provides are more realistic and pleasing acoustic image of the EHE audio reproduction.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method comprising:
in a vehicle engine harmonic enhancement system, providing a first engine harmonic signal, comprising
providing harmonics of a fundamental harmonic frequency;
providing a first set of harmonics of the fundamental harmonic frequency;
separately equalizing each of the first set of harmonics of the fundamental harmonic frequency to provide equalized harmonics so that at least one of the equalized harmonics has a different equalization that at least one of the other equalized harmonics;
providing a second set of harmonics of the fundamental harmonic frequency; and
separately equalizing each of the second set of harmonics of the fundamental harmonic frequency,
wherein the equalizing the first engine harmonic enhancement audio signal comprises
equalizing the first engine harmonic enhancement audio signal to provide a first equalized engine harmonic enhancement signal and
transducing the first engine harmonic enhancement audio signal so that the apparent source of the transduced first sound enhancement audio signal is a first vehicle location; and
wherein the equalizing the second engine harmonic enhancement audio signal comprises equalizing the second engine harmonic enhancement audio signal to provide a second equalized engine harmonic enhancement signal so that the second equalized engine harmonic enhancement signal has a different equalization than the first equalized engine harmonic enhancement signal; and
transducing the second engine harmonic enhancement audio signal so that the second apparent source of the transduced second sound enhancement audio signal is a second vehicle location.

2. A method comprising:
in a vehicle engine harmonic enhancement system, providing a first engine harmonic signal, comprising
providing harmonics of a fundamental harmonic frequency;
providing a first set of harmonics of the fundamental harmonic frequency;
separately equalizing each of the first set of harmonics of the fundamental harmonic frequency to provide equalized harmonics so that at least one of the equalized harmonics has a different equalization that at least one of the other equalized harmonics, wherein the providing the first engine harmonic enhancement audio signal comprises
providing a stream of engine harmonic enhancement gains;
smoothing the stream of engine harmonic enhancement gains to provide a stream of smoothed engine harmonic enhancement gains; and
applying the stream of smoothing engine harmonic gains to the first engine harmonic enhancement audio signal.

3. A method according to claim 2, further comprising:
determining if the engine load is increasing or decreasing; and
if the engine load is decreasing, changing a smoothing parameter.

4. A method according to claim 2, wherein the smoothing comprises low pass filtering.

5. In an vehicle audio system comprising a plurality of loudspeakers, an entertainment audio system, and an engine harmonic enhancement system, a method comprising:
in the vehicle audio system, equalizing an entertainment audio signal to provide an equalized entertainment audio signal;
providing an engine harmonic enhancement audio signal;
equalizing the engine harmonic enhancement audio signal separately from the entertainment audio signal to provide an equalized engine harmonic enhancement audio signal so that the equalized harmonic enhancement signal has a different equalization than the equalized entertainment signal; and
combining the equalized entertainment audio signal with the equalized engine harmonic enhancement audio signal.

6. A method according to claim 5, wherein the providing the engine harmonic enhancement audio signal comprises
determining a fundamental harmonic frequency;
providing harmonics of the fundamental harmonic frequency;
separately equalizing each of the harmonics of the fundamental harmonic frequency.

7. A method according to claim 5, wherein the equalizing the engine harmonic enhancement audio signal comprises
processing the engine enhancement audio signal to provide a plurality of engine enhancement audio signal each corresponding to one of the plurality of loudspeakers; and
separately equalizing each of the plurality of engine enhancement audio signals.

* * * * *